(12) United States Patent
Hisada et al.

(10) Patent No.: US 11,816,109 B2
(45) Date of Patent: Nov. 14, 2023

(54) DATA PROVISION METHOD IN A DATA UTILIZATION SYSTEM

(71) Applicant: Hitachi, Ltd., Tokyo (JP)

(72) Inventors: Masaru Hisada, Tokyo (JP); Hironori Emaru, Tokyo (JP); Akihito Kaneko, Tokyo (JP)

(73) Assignee: HITACHI, LTD., Tokyo (JP)

( * ) Notice: Subject to any disclaimer, the term of this patent is extended or adjusted under 35 U.S.C. 154(b) by 185 days.

(21) Appl. No.: 17/336,369

(22) Filed: Jun. 2, 2021

(65) Prior Publication Data
US 2022/0035819 A1 Feb. 3, 2022

(30) Foreign Application Priority Data

Jul. 30, 2020 (JP) .................................. 2020-129491

(51) Int. Cl.
*G06F 16/2455* (2019.01)
*G06F 16/23* (2019.01)
*G06F 9/50* (2006.01)
*G06Q 20/40* (2012.01)
*G06F 9/48* (2006.01)

(52) U.S. Cl.
CPC ...... *G06F 16/24568* (2019.01); *G06F 9/4881* (2013.01); *G06F 9/5077* (2013.01); *G06F 16/2365* (2019.01); *G06Q 20/401* (2013.01); *G06Q 2220/00* (2013.01)

(58) Field of Classification Search
CPC .......... G06F 16/24568; G06F 16/2365; G06F 9/4881; G06F 9/5077; G06Q 20/401; G06Q 2220/00

USPC ......................................................... 707/722
See application file for complete search history.

(56) References Cited

U.S. PATENT DOCUMENTS

| | | | |
|---|---|---|---|
| 10,417,219 B1* | 9/2019 | Yang ..................... | H04L 9/0643 |
| 11,544,229 B1* | 1/2023 | Seideman ............. | H04L 9/0637 |
| 2019/0303362 A1 | 10/2019 | Yang et al. | |
| 2019/0311443 A1* | 10/2019 | Blades .................. | H04L 9/3239 |
| 2020/0213329 A1* | 7/2020 | Simons ................. | H04L 9/3297 |
| 2022/0245727 A1* | 8/2022 | Roll ....................... | H04L 9/3297 |

FOREIGN PATENT DOCUMENTS

JP 2019-176458 A 10/2019

* cited by examiner

*Primary Examiner* — Robert W Beausoliel, Jr.
*Assistant Examiner* — Lauren Zannah Ganger
(74) *Attorney, Agent, or Firm* — MATTINGLY & MALUR, PC

(57) ABSTRACT

To promote data utilization by providing processed data while leaving a trail that is hardly falsified. A data management server 2000B receives an analysis request, executes an analysis program 2500B, and transfers the analysis request to a data processing server 3000, allowing second data resulting from processing first data to be saved in storage (8160). The data management server 2000B further receives the notification of having processed the first data from the data processing server (8190), generates a transaction indicating the first data having been processed according to the analysis request (8050), and adds the verified transaction as a record in a processing/usage trail management table 11000 as one of distributed shared ledgers (8070).

15 Claims, 17 Drawing Sheets

FIG. 10A

| TX ID | DATA ID | USER ID | PROVIDER ID | EXAMINATION REQUEST TIME EXAMINATION IMPLEMENTATION TIME | STATUS | TX TIME | USER SIGNATURE | PROVIDER SIGNATURE | VERIFICATION TIME | VERIFIER SIGNATURE |
|---|---|---|---|---|---|---|---|---|---|---|
| B1001 | 00011 | 200 | 100 | 2020/4/16 10:00:01<br>2020/4/16 10:47:34 | 1 | 2020/4/16 10:51:00 | mQG3d4av... | hcioUS38u... | 2020/4/16 10:53:23 | 4U+tJ9E0a... |
| B1002 | 00022 | 200 | 100 | 2020/4/16 10:00:01<br>2020/4/16 10:47:34 | 1 | 2020/4/16 10:55:47 | mQG3d4av... | hcioUS38u... | 2020/4/16 10:57:89 | 13ihdeihAk3... |
| B1003 | 00033 | 200 | 100 | 2020/4/16 10:00:01<br>2020/4/16 10:47:34 | 1 | 2020/4/16 10:58:24 | mQG3d4av... | hcioUS38u... | 2020/4/16 11:02:20 | KXxhd843h8... |
| B1004 | 00044 | 200 | 100 | 2020/4/16 10:00:01<br>2020/4/16 10:47:34 | 1 | 2020/4/20 13:52:45 | mQG3d4av... | hcioUS38u... | 2020/4/20 13:55:21 | HWe39249... |
| B1005 | 00055 | 300 | 100 | 2020/4/16 10:00:01<br>2020/4/16 10:47:34 | 0 | 2020/4/20 20:12:98 | pjbjREAUk... | hcioUS38u... | 2020/4/20 20:15:21 | eh862diaA... |

| TX ID | TX TYPE | PARENT TX | DATA ID | USER ID | PROVIDER ID | EXAMINATION REQUEST TIME / EXAMINATION IMPLEMENTATION TIME | STATUS | TX TIME | USER SIGNATURE | PROVIDER SIGNATURE | VERIFICATION TIME | VERIFIER SIGNATURE |
|---|---|---|---|---|---|---|---|---|---|---|---|---|
| B1001 | A | – | 00011 | 200 | 100 | 2020/4/16 10:00:01 | – | 2020/4/16 10:51:00 | mQG3d4av... | hcioUS38u... | 2020/4/16 10:53:23 | 4U+tJ9E0a... |
| B1002 | B | B1001 | 00022 | 200 | 100 | 2020/4/16 10:47:34 | 1 | 2020/4/16 10:55:47 | mQG3d4av... | hcioUS38u... | 2020/4/16 10:57:89 | 13ihdeihAk3... |
| B1003 | A | – | 00044 | 200 | 100 | 2020/4/20 10:00:01 | – | 2020/4/20 10:58:24 | mQG3d4av... | hcioUS38u... | 2020/4/20 11:02:20 | KXhd843h8... |
| B1004 | B | B1003 | 00044 | 200 | 100 | 2020/4/16 10:47:34 | 0 | 2020/4/20 13:52:45 | mQG3d4av... | hcioUS38u... | 2020/4/20 13:55:21 | HWe39249... |

FIG. 11

| TX ID | REQUEST ID | TASK ID | PARENT DATA ID | CHILD DATA ID | USER ID | PROVIDER ID | PROCESSOR ID | USAGE RANGE | COMPUTATION RESOURCE | PROCESS START/END TIME | GENERATED DATA FORMAT | TX TIME | PROVIDER SIGNATURE | VERIFICATION TIME | VERIFIER SIGNATURE |
|---|---|---|---|---|---|---|---|---|---|---|---|---|---|---|---|
| C200-1 | XYZ | XYZ-1 | 00022 | 00022-1 | 200 | 100 | 100 | Tokyo | NO. OF CORES: 1 ○× ver1.1 | 2020/4/17 11:52:01 −2020/4/17 11:54:98 | PM2.5 | 2020/4/19 18:58:02 | hcioUS 38u... | 2020/4/19 18:21:24 | 4U+tJ9 E0a... |
| C200-1 | XYZ | XYZ-2 | 00033 | 00033-1 | 200 | 100 | 100 | Tokyo, 2020/4/29 −... | NO. OF CORES: 2 △× ver1.2 | 2020/4/17 11:57:25 −2020/4/17 12:03:15 | METEOR-OLOGICAL DATA | 2020/4/19 18:58:02 | hcioUS 38u... | 2020/4/19 18:21:24 | 4U+tJ9 E0a... |
| C200-1 | XYZ | XYZ-3 | 00011, 00022-1 | 00011-1 | 200 | 100 | 100 | xx-zz | NO. OF CORES: 1 ○× ver1.1 | 2020/4/17 12:08:76 −2020/4/17 21:13:94 | METEOR-OLOGICAL DATA PM2.5 | 2020/4/19 18:58:02 | hcioUS 38u... | 2020/4/19 18:21:24 | 4U+tJ9 E0a... |
| C200-1 | XYZ | XYZ-4 | 00011-1, 00033-1 | 00044 | 200 | 100 | 100 | − | NO. OF CORES: 16 ○× ver3.1 ○× ver2.2 ...... | 2020/4/17 21:19:35 −2020/4/19 17:49:27 | PM2.5 DISTRI-BUTION FORECAST | 2020/4/19 18:58:02 | hcioUS 38u... | 2020/4/19 18:21:24 | 4U+tJ9 E0a... |

| TX ID | DATA ID | PROVIDER ID | DATA FORMAT | OBSER-VATION DATE | OBSER-VATION SITE | OBSER-VATION TIME | TX TIME | USER SIGNATURE | PROVIDER SIGNATURE | VERIFI-CATION TIME | VERIFIER SIGNATURE |
|---|---|---|---|---|---|---|---|---|---|---|---|
| A1001 | 00011 | 100 | AMeDAS | 2020/4/14 0:00–23:59 | TOKYO'S 23 WARDS | 0,1,...24H | 2020/4/15 10:50:00 | — | hcioUS3 8u... | 2020/4/15 10:54:24 | 4U+tJ9E 0a... |
| C2001 | 00044 | 100 | PM2.5 DISTRI-BUTION FORECAST | 2020/4/29–2020/5/6 | TOKYO'S 23 WARDS | 0:00–23:59 | 2020/4/19 18:20:05 | mQG3d4 av... | hcioUS3 8u... | 2020/4/19 18:22:43 | 13ihdeih Ak3... |

12000
12001 — TX ID
12002 — DATA ID
12003 — PROVIDER ID
12004 — (DATA FORMAT / OBSERVATION DATE / SITE / TIME)
12005 — TX TIME
12006 — USER SIGNATURE
12007 — PROVIDER SIGNATURE
12008 — VERIFICATION TIME
12009 — VERIFIER SIGNATURE

FIG. 13

| TX ID | BILLING SOURCE ID | BILLING DESTINATION ID | TARGETED TXID | CURRENCY AMOUNT | TX TIME | USER SIGNATURE | PROVIDER SIGNATURE | VERIFICATION TIME | VERIFIER SIGNATURE |
|---|---|---|---|---|---|---|---|---|---|
| D1001 | 100 | 200 | C2001 | 1500 | 2019/4/19 18:50:00 | mQG3d4av. | hcioUS38u. | 2020/4/19 19:01:24 | 4U+tJ9E0a. |
| D1002 | 100 | 200 | C2002 | 300 | 2019/4/20 21:15:05 | mQG3d4av. | hcioUS38u. | 2020/4/20 21:19:43 | l3ihdeihAk3 |
| D1003 | 100 200 | 300 | C2003 | 400 | 2019/4/25 20:50:40 | ls7GxII0+... | hcioUS38u. | 2020/4/25 20:52:04 | KXhd843h8 |

FIG. 14

| DATA ID | DATA PATH | PARENT DATA ID | REGISTRANT ID | REGISTRATION TIME |
|---|---|---|---|---|
| 00011 | http://xxxx.xx1 | - | 100 | 2020/4/15 10:49:55 |
| 00022 | http://xxxx.xx2 | - | 100 | 2020/4/17 9:51:05 |
| 00033 | http://xxxx.xx3 | - | 100 | 2020/4/18 13:55:40 |
| 00044 | http://xxxx.xx4 | 00011 00022 00033 | 100 | 2020/4/19 18:21:24 |

FIG. 15

| REQUEST ID | TASK ID | PARENT DATA ID | DATA PATH (PARENT) | CHILD DATA ID | DATA PATH (CHILD) | USER ID | PROVIDER ID | PROCESSOR ID | USAGE RANGE | COMPUTATION RESOURCE SOFTWARE/ PARAMETER | PROCESS START TIME PROCESS END TIME |
|---|---|---|---|---|---|---|---|---|---|---|---|
| XYZ | XYZ-1 | 00022 | http://xx xx.xx2 | 00022-1 | http://xx xx.yy2 | 200 | 100 | 100 | Tokyo | NO. OF CORES: 1 ○×ver1.1 | 2020/4/17 11:52:01 −2020/4/17 11:54:98 |
| ... | ... | ... | ... | ... | ... | ... | ... | ... | ... | ... | ... |
| XYZ | XYZ-4 | 00011-1 00033-1 | http://xx xx.yy1, http://xx xx.yy3 | 00044 | http://xx xx.xx4 | 200 | 100 | 100 | ... | NO. OF CORES: 16 ○×ver3.1 ○×ver2.2 ...... | 2020/4/17 21:19:35 −2020/4/19 17:49:27 |

15000, 15001, 15002, 15003, 15004, 15005, 15006, 15007, 15008, 15009, 15010, 15011, 15012

DATA PROVISION METHOD IN A DATA UTILIZATION SYSTEM

CROSS-REFERENCE TO RELATED APPLICATION

This application claims priority to Japanese Patent Application No. 2020-129491 filed on Jul. 30, 2020, the entire contents of which are incorporated by reference herein.

TECHNICAL FIELD

The present invention relates to a data provision method in a data utilization system.

BACKGROUND ART

A blockchain is a decentralized database (ledger) in which all the transaction data in the past is grouped into blocks and the blocks are connected like a chain. The ledger is validated by a large number of computers on the network. The identical ledger is shared. Any participant can reference the ledger. A public chain recognizes an unspecified number of people as participants. A private chain or a consortium chain permits only predetermined participants to participate. Each block of the blockchain contains apart determined by the preceding block. Therefore, modifying past transaction data loses consistency with the next block. Besides, connection to a new block requires the consensus of multiple participants. Therefore, it is practically difficult to falsify the contents of a ledger.

The blockchain is widely used by taking advantage of the fact that falsifying the ledger is difficult. The blockchain is examined to find wide application not only to crypto-assets but also to electronic data sharing among multiple institutions, proof of rights, and supply chains, for example. In particular, the blockchain has a high affinity for data sharing platforms in that the blockchain can ensure the reliability of transactions among multiple institutions. For example, patent literature 1 proposes the data sharing platform using blockchains.

CITATION LIST

Patent Literature

Patent Literature 1: Japanese Unexamined Patent Application Publication No. 2019-176458

SUMMARY OF INVENTION

Technical Problem

The data sharing platform disclosed in Patent Literature 1 assumes transactions in units of original data. Namely, a data user pays the usage fee for data saved by a data provider on a data storage server. The relevant data is transmitted from the data storage server.

However, from the viewpoint of an increasing capacity of data and protection of personal information, there is expected an increase in the need to transact extracted data from large-capacity data and feature data obtained by processing large-capacity data rather than entirely transacting a large amount of data as original data. A data user who requires using big data for machine learning and statistical analysis does not need the original data itself. It is sufficient for the user to perform predetermined processing on the original data and acquire data based on an appropriate data range or data format.

The present invention proposes a data utilization system and a data provision method in the data utilization system capable of promoting data utilization by ensuring the reliability of processed data provided by a data provider for a data user in a data sharing platform that provides processed data resulting from processing original data according to requirements of the data user.

Solution to Problem

The data provision method as an embodiment of the present invention applies to a data utilization system that is connected to a network and has a plurality of data management servers including a first data management server for a first user and a second data management server for a second user and a data processing server. Each of the data management servers maintains a distributed shared ledger. The first data management server executes a data registration program to save first data in storage, generates a first transaction indicating the first data having been saved, and adds the verified first transaction as a record in a metadata management table as one of the distributed shared ledgers. The second data management server transmits an analysis request for processing the first data to the first data management server. The first data management server receives the analysis request, executes an analysis program, and transfers the analysis request to the data processing server, allowing second data resulting from processing the first data to be saved in storage. Further, the first data management server receives the notification of having processed the first data from the data processing server, generates a second transaction indicating the first data having been processed according to the analysis request, and adds the verified second transaction as a record in a processing/usage trail management table as one of the distributed shared ledgers.

Advantageous Effects of Invention

Even if a data provider is unwilling to provide original data as is to the outside, processed data is generated from the original data and is saved as a trail that is hardly falsified. The processed data can be provided for others to promote data utilization.

Other objects and novel features of the invention will be apparent from the following description of the specification taken in connection with the accompanying drawings.

BRIEF DESCRIPTION OF DRAWINGS

FIG. 10A is an example data structure of an access right management table;

FIG. 10B is an example data structure of an access right management table;

FIG. 11 is an example data structure of a processing/usage trail management table;

FIG. 12 is an example data structure of a metadata management table;

FIG. 13 is an example data structure of a billing table;

FIG. 14 is an example data structure of a data management table; and

FIG. 15 is an example data structure of a process execution management table.

DESCRIPTION OF EMBODIMENTS

Figure 1A:
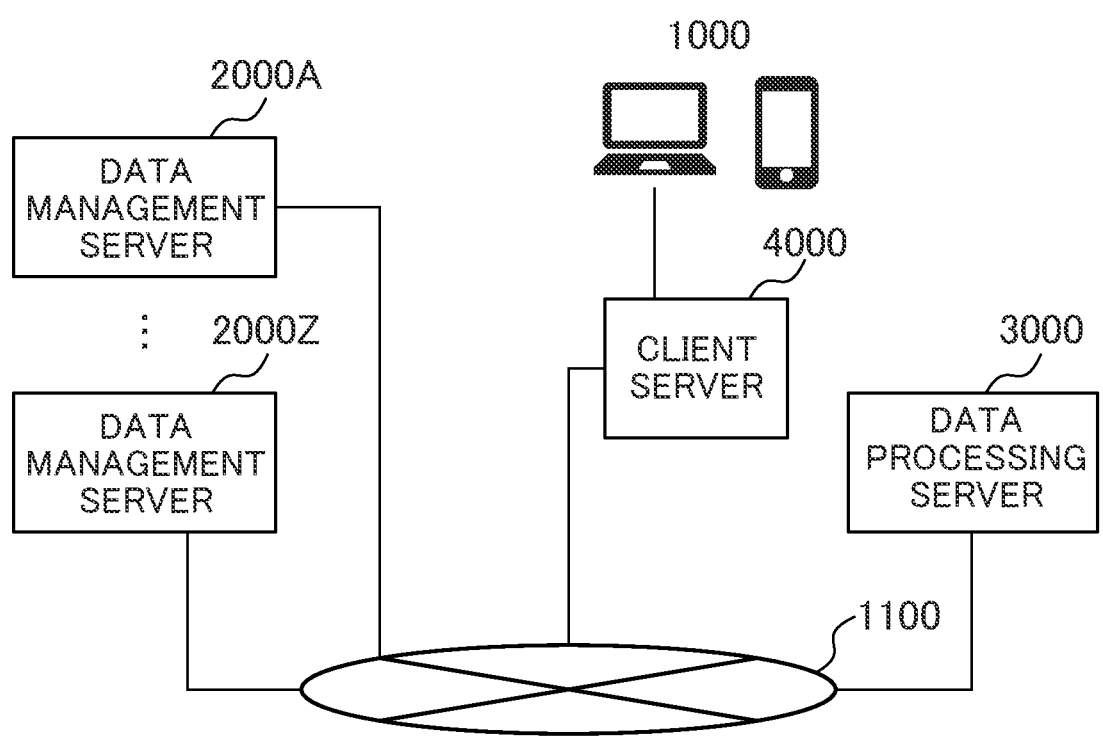
FIG. 1A is an overall configuration diagram illustrating a data utilization system.

Embodiments of the present invention will be described in further detail based on the accompanying drawings. Elements having the same function are given the same reference numerals in the drawings referenced to describe the embodiments and a duplicate description is omitted.

FIG. 1A illustrates an overall configuration diagram of the data utilization system. The system includes a data management server 2000, a data processing server 3000, and a client server 4000 that are mutually connected via a network 1100 to be able to communicate with each other. The network 1100 may be wired, wireless, or a combination thereof. The system configuration in FIG. 1A is suitable for embodying services provided by the data utilization system according to the present embodiment on a public cloud.

The data management server 2000 is provided for each agent (user) that uses the data utilization system. It is not necessary to assign one data management server to each user. Multiple users may share one data management server. Agents of the data utilization service described in this embodiment include data user A and data provider B. The agent may be an individual or an organization such as a company. The role of the agent is not always fixed. The agent can be data user A or data provider B. To simplify the explanation below, data user A and data provider B are described as agents playing only their corresponding roles, unless otherwise specified. Data user A requests data provider B, maintaining original data, to provide processed data resulting from applying a predetermined process to the original data. When receiving the request, data provider B performs a process according to the request on the original data and provides data user A with the processed data resulting from processing the original data. The data utilization system according to the present embodiment uses a smart contract to perform important procedures in the process from registration of original data to provision of processed data and billing and leaves a trail that is hardly falsified. Specifically, the procedures include registration of the original data, examination of the use of the original data, processing (process) of the original data, and billing.

The data management server 2000 includes a common function to perform the smart contract and includes a distributed shared ledger that records various transactions in the data utilization.

Each agent (user) accesses the data utilization system from a terminal 1000 via the client server 4000. Input from the terminal 1000 is transmitted to the corresponding data management server 2000 via the client server 4000. For example, when the user is data user A, the input is transmitted to a data management server 2000A of data user A. When the user is data provider B, the input is transmitted to a data management server 2000B of data provider B. The terminal 1000 may be available as a PC (Personal Computer), a smartphone, or a tablet.

The data processing server 3000 performs processing according to the request of data user A on the original data maintained by data provider B. The data processing server 3000 may be shared among agents of the data utilization system or dedicated to data provider B. Further, the data processing server 3000 may be dedicated to data processor C when data processor C exists as an agent of the data utilization system. The data utilization system may include multiple data processing servers 3000. Multiple data processors may exist.

Figure 1B:
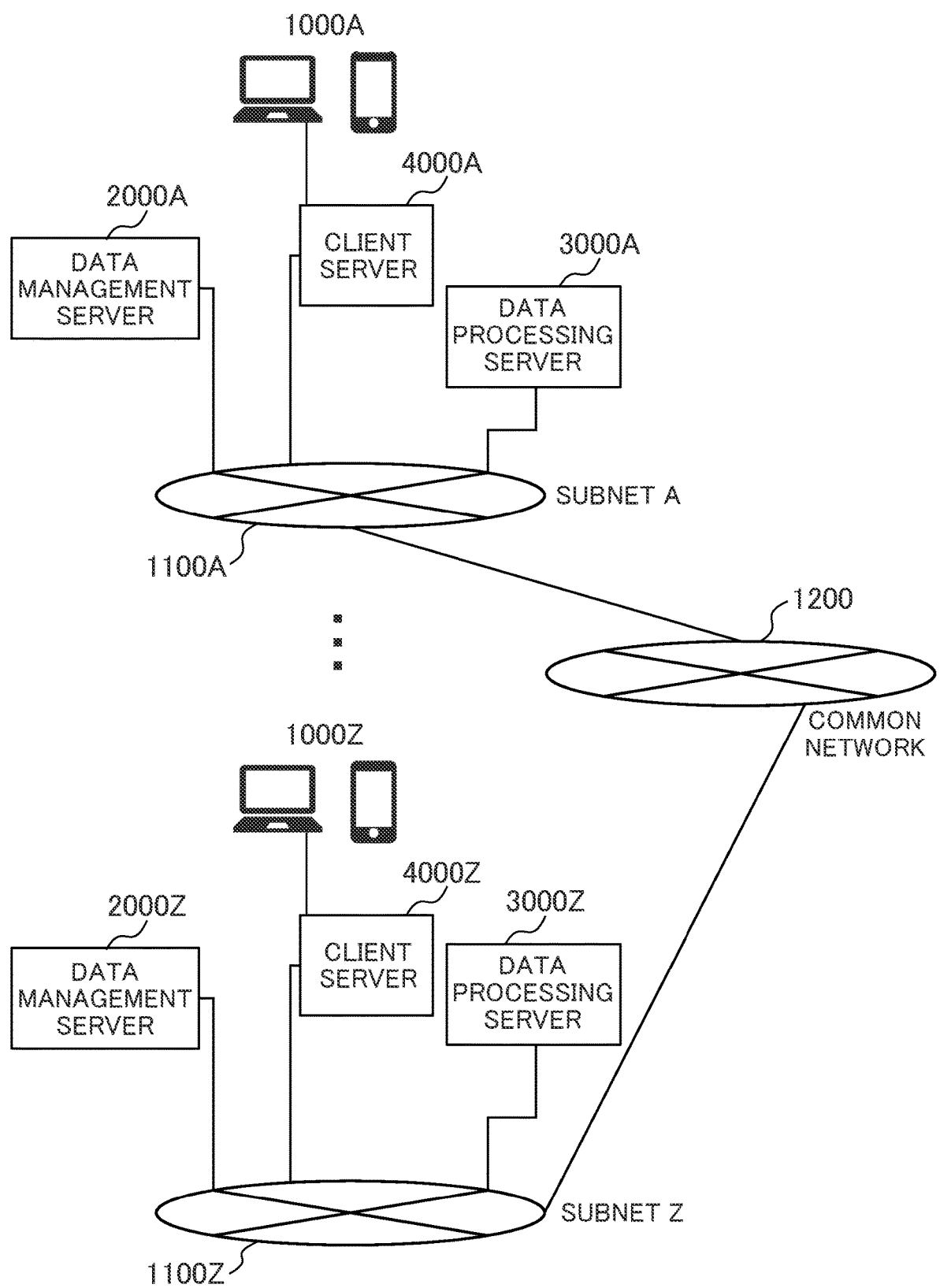
FIG. 1B is an overall configuration diagram illustrating a data utilization system.

FIG. 1B is another overall configuration of the data utilization system. The system includes multiple subsystems each of which includes a data management server 2000, a data processing server 3000, and a client server 4000 that can communicate with each other via a subnet 1100. Multiple subsystems are further communicatively connected via a common network 1200. The subsystem is provided for each agent that uses the data utilization system. The data processing server 3000 is also provided for the subsystem to be dedicated to the agent. The common network 1200 may be wired, wireless, or a combination thereof. The system configuration in FIG. 1B is suitable for embodying data utilization services according to the present embodiment on a private cloud.

The overall configuration diagrams of FIGS. 1A and 1B illustrate typical examples, and various modifications are allowed. For example, an overall configuration may connect the subsystem of FIG. 1B to the system of FIG. 1A. Another overall configuration may provide the system of FIG. 1B so that a data processing server shared among agents of the data utilization system is placed on the common network 1200.

The hardware configuration of each server will be described.

Figure 2:
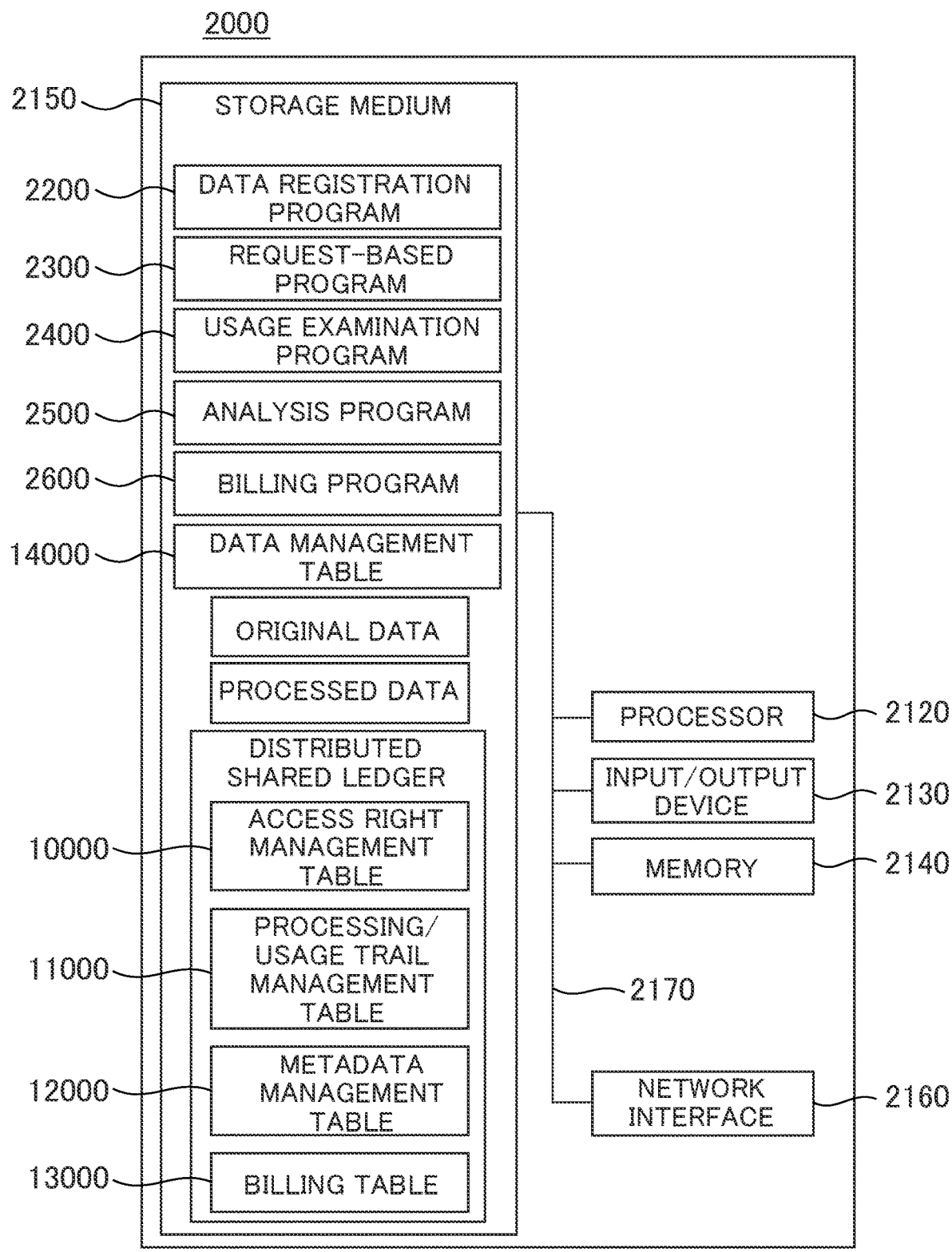
FIG. 2 is a hardware configuration diagram illustrating a data management server.

FIG. 2 illustrates the hardware configuration diagram of the data management server 2000. The data management server 2000 includes a processor 2120, an input/output device 2130, memory 2140, a storage medium 2150, and a network interface 2160. These are communicably connected via a bus 2170. The input/output device 2130 provides information input/output to/from external devices. The network interface 2160 enables connection to the network 1100. In the following description, a symbol indicating an agent (user) is suffixed to symbols used for the data management server 2000 and its configurations to explicitly denote the agent that uses the data management server 2000. For example, data management server 2000A explicitly denotes the data management server 2000 for data provider A.

The storage medium 2150 is a non-volatile storage device such as an HDD (Hard Disk Drive) or SSD (Solid State Drive) and stores programs executed by the data management server 2000 and data processed by the programs. The data includes target data to be utilized and management data as management information about the target data. FIG. 2 illustrates the data management server for data provider B to store the target data such as original data and processed data resulting from processing the original data. However, when the target data is large-scale data such as big data, it is not necessary to store the data contents in the storage medium 2150. For example, it just needs to store the target data in object storage on the cloud and store a data path to access the target data. The management data includes a data management table 14000 to manage target data and various distributed shared ledgers recorded as trails. According to the present embodiment, only the data management server for data provider B stores the original data as target data.

The memory 2140 is composed of RAM (Random Access Memory) and temporarily stores a program and data needed to execute the program from the storage medium 2150 based on instructions from the processor 2120. The processor 2120 executes a program loaded from the storage medium 2150 into the memory 2140.

The contents of the programs and data stored in the storage medium 2150 will be described later. The functionality of the data management server 2000 is embodied by allowing the processor 2120 to execute the programs stored in the storage medium 2150.

Figure 3:
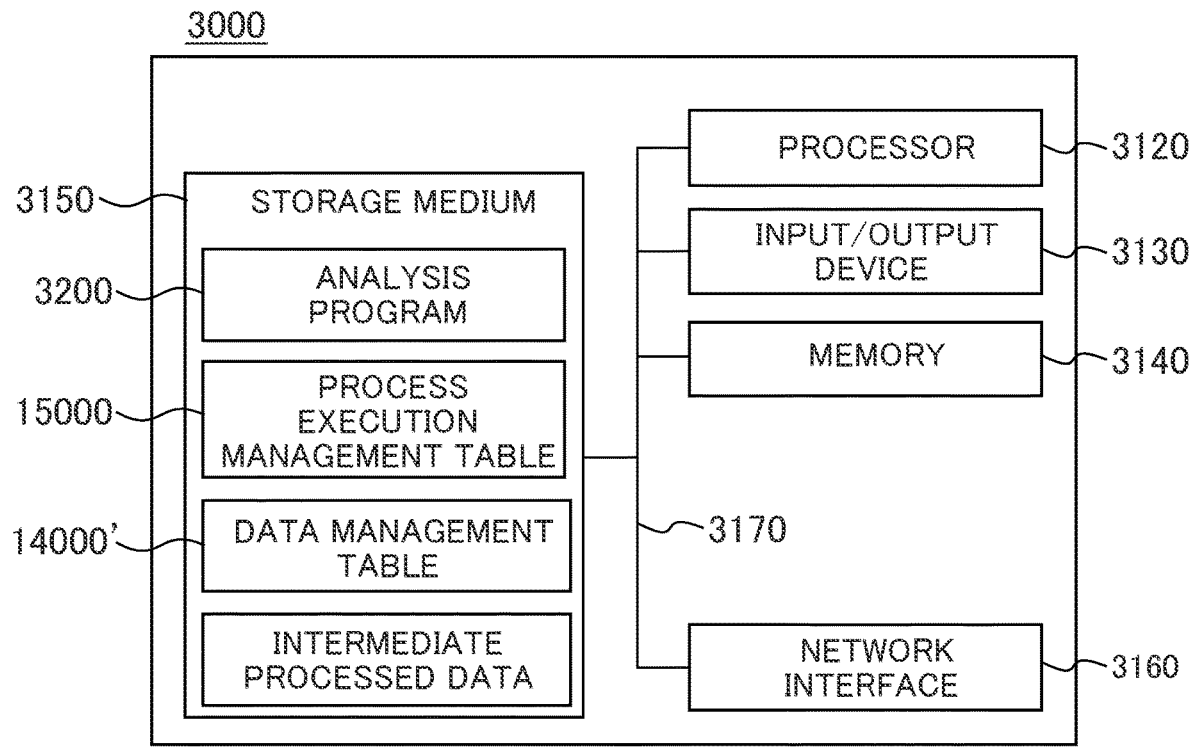
FIG. 3 is a hardware configuration diagram illustrating a data processing server.
Figure 4:
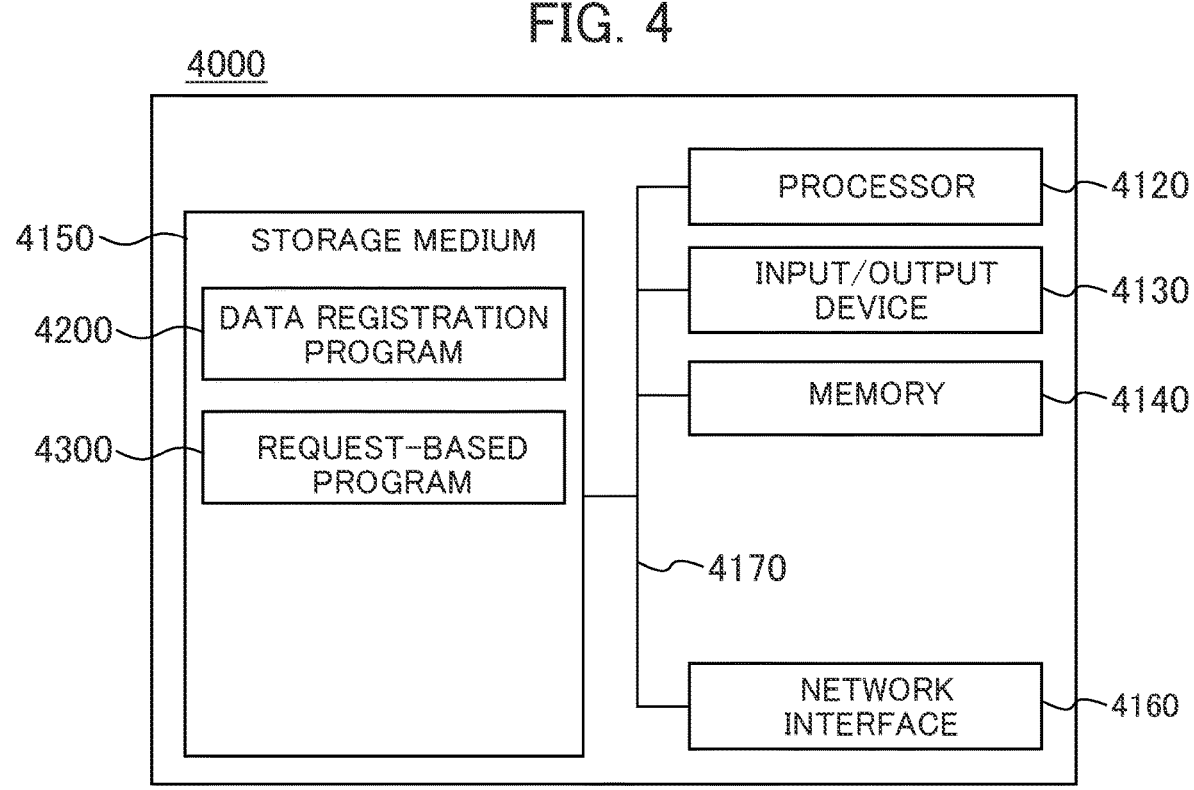
FIG. 4 is a hardware configuration diagram illustrating a client server.

FIG. 3 is a hardware configuration diagram of the data processing server 3000. FIG. 4 is a hardware configuration diagram of the client server 4000. The hardware configuration itself is the same as the data management server in FIG. 2 and a description is omitted.

The description below explains the data provision method of the data utilization system based on an example of using the data utilization system according to the present embodiment. The example assumes that data provider B accumulates meteorological data and data user A requests data provider B to provide meteorological forecasts in a specific area during a specific period.

For example, data provider B is assumed to accumulate mesh data on observed weather throughout Japan. The mesh data is a collection of observation data and forecast data related to the weather at predetermined time intervals in units of a specifically sized area such as one square kilometer. Meteorological data is assumed to include weather, temperature, precipitation, atmospheric pressure, wind speed or direction, and PM (particulate matter) 2.5 concentration, for example. The description below explains an example in which data user A requests data provider B to provide PM2.5 distribution forecast data in the 23 wards of Tokyo for the next week based on the meteorological observation data (original data) accumulated by data provider B.

Original Data Registration Flow

Figure 5:
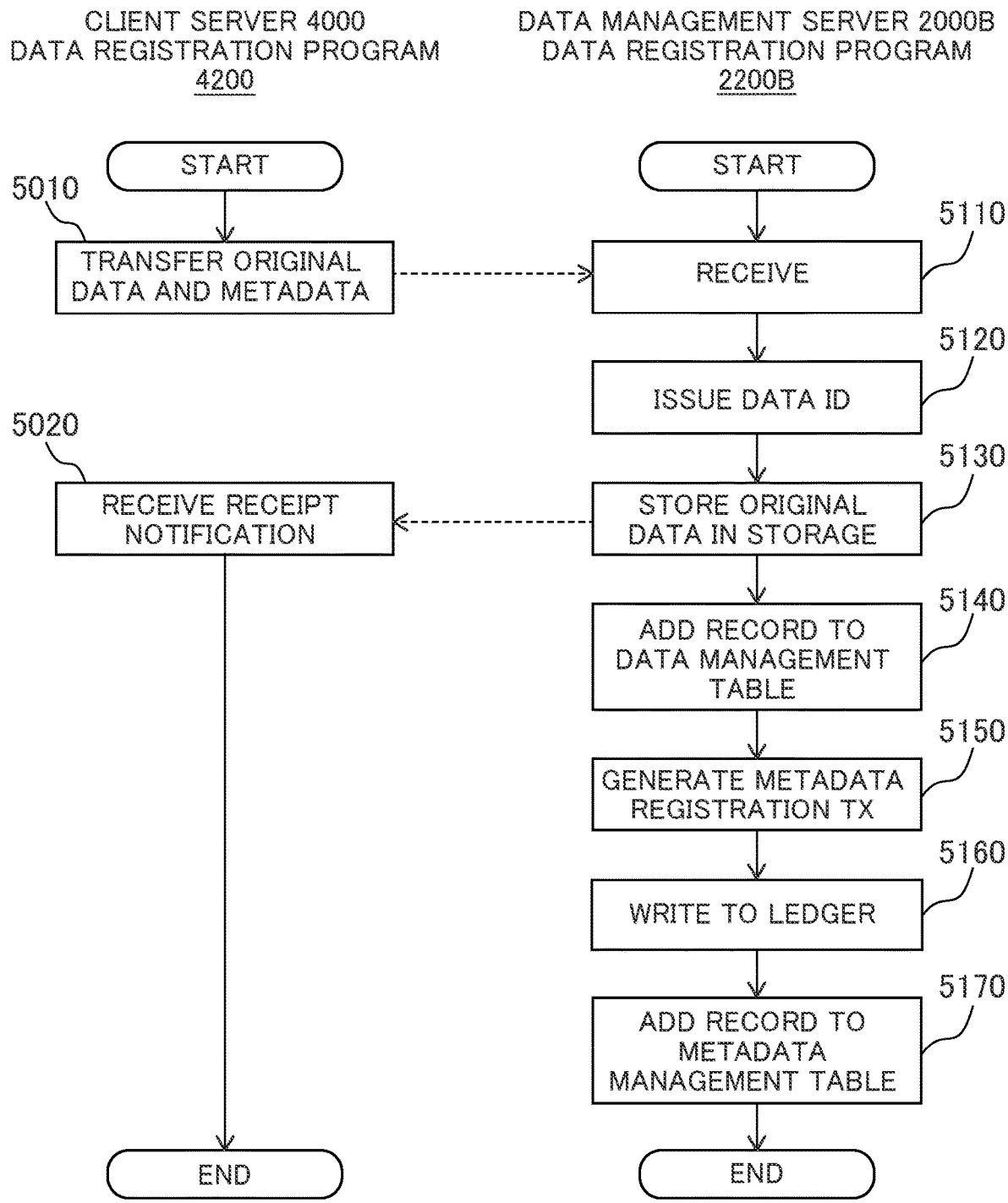
FIG. 5 is an original data registration flowchart.

FIG. 5 illustrates a flow in which data provider B registers original data (such as meteorological data) in its own data management server 2000B before data utilization. Data provider B registers the original data to the data management server 2000B via the client server 4000.

Data provider B starts a data registration program 4200 for the client server 4000 and transfers the original data and corresponding metadata (described later) to the data management server 2000B of data provider B (5010). The data registration assumes that the original data is preformed into a predetermined format from raw data. The metadata is generated by extracting data outlining the original data from the original data, based on the data format of the original data. Alternatively, data provider B can manually enter the metadata based on the contents of the original data.

The data registration program 2200B for the data management server 2000B receives the original data and its metadata from the client server 4000 (5110), then issues a data ID for the original data (5120), and stores the original data in the storage medium 2150 (5130). The data ID issued at step 5120 is unique throughout the entire system. According to the present embodiment, the distributed shared ledger records the data history such as data registration or processing as a trail that is highly protected against falsification. Therefore, the distributed shared ledger records new original data acquired by data provider B. The data ID must be unique throughout the system so that the data ID is not duplicated in the distributed shared ledger. Assigning the ID to each record of the distributed shared ledger is the same process as generating a ledger of general blockchain and a detailed description is omitted. At step 5120, the data management server 2000B may issue a unique local data ID. The distributed shared ledger may additionally include a conversion table between the local data ID and the data ID assigned to the original data.

The data registration program 2200B issues a receipt notification when completing the storage of the original data in the storage medium 2150. The data registration program 4200 terminates when the data registration program 4200 of the client server 4000 receives the receipt notification (5020).

Meanwhile, the data registration program 2200B of the data management server 2000B adds a record for the newly registered original data to the data management table 14000 (5140).

FIG. 14 illustrates an example data structure of the data management table 14000. The data management table 14000 includes data ID column 14001, data path column 14002, parent data ID column 14003, registrant ID column 14004, and registration time column 14005. Column 14001 records a data ID of data to be registered. Column 14002 records an address (data path) to store data. Column 14003 records a data ID of source data (referred to as parent data) for the registered data that is processed data resulting from processing another data. Column 14004 records a user ID used to register the data. Column 14005 records the time to have registered the data to the data management server 2000B.

Suppose record 14011 is associated with the original data saved at step 5130. Then, the column 14001 registers the data ID assigned at step 5120. Column 14003 registers "— (null)" because this data is not processed. Column 14004 registers "100" indicating data provider B. The data management table 14000 may be extended to additionally store metadata of the registered data.

The data registration program 2200B then generates a transaction (metadata registration TX) that indicates the registration of new data to the system (5150). The generated transaction is validated by another data management server having a distributed processing ledger and then is written to the distributed processing ledger (5160). The transaction is added as a single record in a metadata management table (5170).

FIG. 12 illustrates an example data structure of a metadata management table 12000 as a distributed shared ledger. The metadata management table 12000 includes transaction ID column 12001, data ID column 12002, provider ID column 12003, metadata column 12004, transaction time column 12005, user signature column 12006, provider signature column 12007, verification time column 12008, and verifier signature column 12009. Column 12001 records an ID (TXID) that uniquely identifies a transaction (history). Column 12002 records a data ID. Column 12003 records a user ID used to provide the data. Column 12004 records metadata of the data. Columns 12005 to 12009 record transaction verification information. Specifically, column 12005 records the time to have generated the transaction. Column 12006 records the signature of a data user. Column 12007 records the signature of a data provider. Column 12008 records the time when a verifier verified the transaction. Column 12009 records the signature of the verifier who verified the transaction. Metadata column 12004 registers metadata of the data and includes a data format for the data and an item corresponding to each data format.

Suppose TXID "A1001" is a record concerning the original data saved at step 5130. Then, column 12002 registers the data ID assigned at step 5120. Column 12004 registers the metadata received at step 5110. Column 12006 registers "−" because new original data is registered. Column 12007 registers the signature of data provider B.

The above-described process registers the original data registered by data provider B to the metadata management table, enabling the user of the data utilization system to use the original data.

Data Utilization Flow

Figure 6:
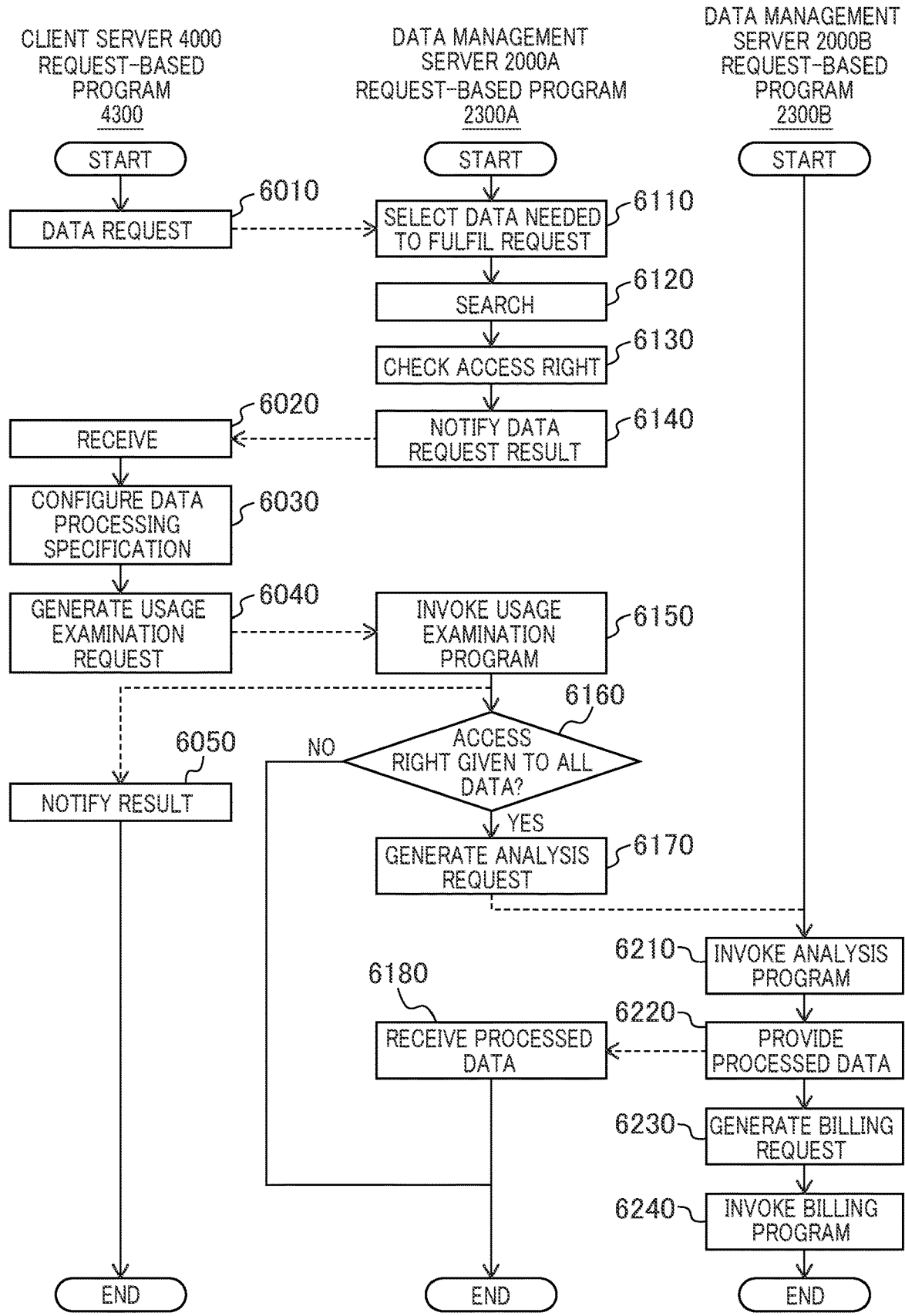
FIG. 6 is a data utilization flowchart.

FIG. 6 illustrates a data utilization flow in which data user A requests data provider B to provide processed data resulting from processing the original data (weather observation or forecast data) maintained by data provider B, receives the processed data (PM2.5 distribution forecast data), and reaches the billing stage.

Data user A starts a request-based program 4300 of the client server 4000 and issues a data request to the data management server 2000A of data user A (6010). The data request includes information about the requested processed data, for example, data format (PM2.5), period (next week), and region (Tokyo's 23 wards).

The client server 4000 transmits the data request to the data management server 2000A of data user A, and then the request-based program 2300A selects data needed to fulfill the request (6110). For example, suppose the necessary data selected from the data request includes "last month's AMeDAS measurement data in Tokyo's 23 wards," "last month's PM2.5 measurement data in Tokyo's 23 wards," and "weather forecast data for the next month in Tokyo's 23 wards."

The request-based program 2300A searches the metadata management table 12000 to confirm whether the data utilization system registers data needed to acquire the processed data (6120). Suppose the search confirms that data provider B maintains "last month's AMeDAS measurement data in Tokyo's 23 wards," "last month's PM2.5 measurement data in the Kanto region," and "weather forecast data for the next month in Japan" each containing necessary data.

The request-based program 2300A searches the access right management table 10000 as a distributed shared ledger to confirm the presence or absence of access right (6130). According to the present embodiment, the access right is assumed to be available when the access right management table 10000 to record the data usage examination history contains the history indicating that the access right is given to the relevant data in the past. Otherwise, the access right is assumed to be unknown (or unavailable). The access authority check method at step 6130 may be performed according to an access authority management method in the system. For example, the access right can be confirmed by referencing the metadata management table 12000 when the metadata management table 12000 identifies and records agents given the access right for each data. Meanwhile, step 6130 can be omitted in a system that assumes a system agent to be given the access right over data registered in the system.

The request-based program 2300A transmits a data request result notification to the client server 4000 (6140). The data request result notification contains a result of searching the metadata management table 12000 and a result of checking the access right in reply to the data request from user A. The request-based program 4300 of the client server 4000 receives the data request result notification from the data management server 2000A (6020). Based on the data request result notification, data user A uses the request-based program 4300 to confirm a list of data needed to fulfill the request and the need for usage examination on each of the data. Data user A then configures the data processing specifications (computational resources) required to process the original data to acquire processed data (6030). This is because the accuracy of prediction as processed data or the time required to acquire the prediction varies with the algorithm or parameters to be used, or the computing power of a data processing server to be used. After configuring the data processing specifications, data user A uses the request-based program 4300 to generate a usage examination request for target data to data provider B (6040). The client server 4000 transmits the usage examination request to the data management server 2000A of data user A. Then, the request-based program 2300A invokes a usage examination program 2400A (6150).

The access right may be given to all data as a result of the usage examination described later (Yes at step 6160). Then, the request-based program 2300A generates an analysis request for data provider B (6170). The access right may not be given to all data (No at step 6160). Then, the request-based program 2300A terminates. The usage examination result is transmitted from the data management server 2000A to the client server 4000 and is notified to data user A (6050).

The access right may be already given to all data when the data request result notification is received (6020). Then, the usage examination request generated at step 6040 is assumed to be automatically approved in the usage examination described below. The request-based program 2300A generates an analysis request to data provider B (6170).

In this example, data to be used is configured in the data management server 2000A of data user A, and then data user A is allowed to configure the data processing specifications via the client server 4000 (6030). However, in a system that does not allow data user A to configure data processing specifications, the request-based program 2300A of the data management server 2000A may automatically generate a usage examination request (6040) and an analysis request (6170) for the data management server 2000B of data provider B. The system that does not configure data processing specifications is expected to increase opportunities to effectively use intermediate processed data described later.

The data management server 2000A transmits the analysis request to the data management server 2000B of data provider B. Then, the request-based program 2300B of the data management server 2000B invokes an analysis program 2500B (6210), performs processes according to the analysis request, and generates processed data. The analysis process on the original data will be described later.

The processed data acquired by the analysis process is provided to data user A (6220). As a method of providing the processed data to data user A, the processed data itself may be transmitted to the data management server 2000A, or a data path for the processed data may be transmitted to the data management server 2000A. To provide a large amount of processed data, the transmission of the data path is favorable to reduce the amount of data transferred. Though not explicitly illustrated in the flow of FIG. 6, step 6220 is performed after the process concerning step 6210 has written the transaction to the distributed shared ledger. This aims at preventing a situation where data provider B provides data user A with the processed data without writing to the distributed shared ledger when an error occurs or the transaction is canceled at the transaction verification stage.

The request-based program 2300A of the data management server 2000A receives the processed data (6180) and then terminates.

The request-based program 2300B of the data management server 2000B generates a billing request (6230) and invokes a billing program 2600B (6240) to proceed with billing for the data provision to data user A. The billing process will be described later. When the billing process is complete, the request-based program 2300B terminates to complete the whole procedure of providing the processed data.

Usage Examination Flow

Figure 7A:
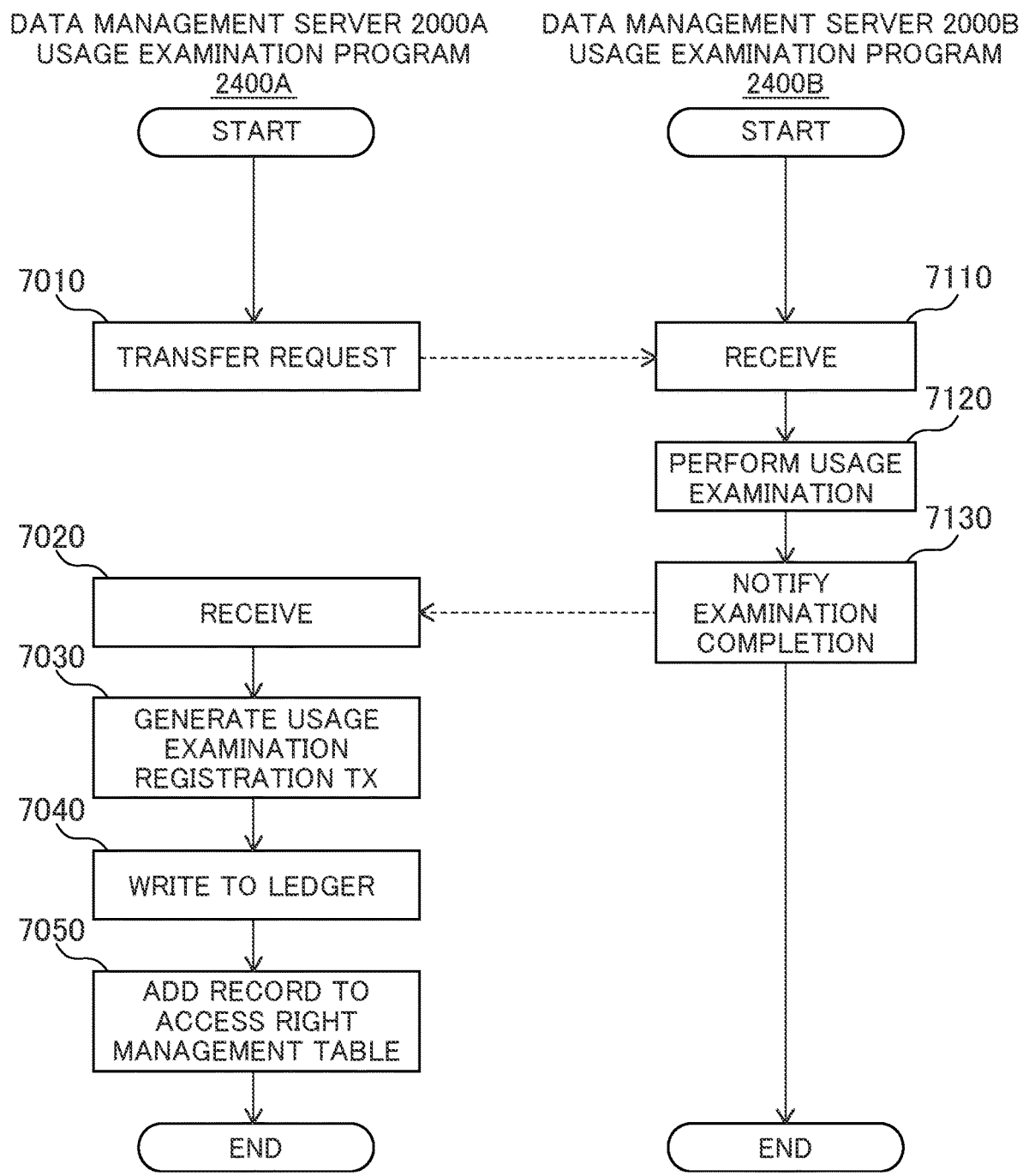
FIG. 7A is a first usage examination flowchart.

The description below explains the usage examination at step 6150 in the flowchart of FIG. 6. FIG. 7A illustrates the first flow of the usage examination.

The usage examination program 2400A of the data management server 2000A transfers the usage examination request generated at step 6040 in the flowchart of FIG. 6 to the data management server 2000B of data provider B (7010).

A usage examination program 2400B of the data management server 2000B receives the usage examination request (7110) and performs the usage examination (7120). The examination method is not limited and may be provided as a white list method or a blacklist method, for example. When the examination is completed, an examination completion notification is transmitted to the data management server 2000A corresponding to each data (7130). The examination completion notification includes examination request time, examination implementation time, and examination result, for example.

The usage examination program 2400A of the data management server 2000A receives the examination completion notification from the data management server 2000B (7020) and then generates a transaction (usage examination registration TX) indicating the examination history of access to the data (7030). The generated transaction is validated by another data management server maintaining the distributed shared ledger and then is written to the distributed processing ledger (7040). The transaction is added as one record to the access right management table (7050).

FIG. 10A illustrates an example data structure of an access right management table 10000a as the distributed shared ledger corresponding to the flowchart of FIG. 7A. The access right management table 10000a includes transaction ID column 10001, data ID column 10002, user ID column 10003, provider ID column 10004, examination time column 10005, status column 10006, transaction time column 10007, user signature column 10008, provider signature column 10009, verification time column 10010, and verifier signature column 10011. Column 10001 records an ID (TXID) that uniquely identifies a transaction (history). Column 10002 records a data ID. Column 10003 records a data usage examination requester, namely, a user ID to use the data. Column 10004 records a data usage examination request reviewer, namely, a user ID to provide the data. Column 10005 records the time to implement the usage examination (examination request time and examination implementation time in this example). Column 10006 records the data usage permission (usage examination result). Columns 10007 through 10011 record the transaction verification information. Column 10006 is set to 1 when the usage examination request for data is permitted or is set to 0 when the usage examination request is rejected.

Suppose TXID "B1001" is a transaction associated with the usage examination of one piece of original data included in the usage examination request received at step 7110. Then, column 10002 registers a data ID of data targeted at the usage examination. Column 10003 registers a data user ID of user A. Column 10004 registers a user ID of data provider B. Column 10006 registers "1" indicating that the usage examination request is permitted for the data.

Figure 7B:
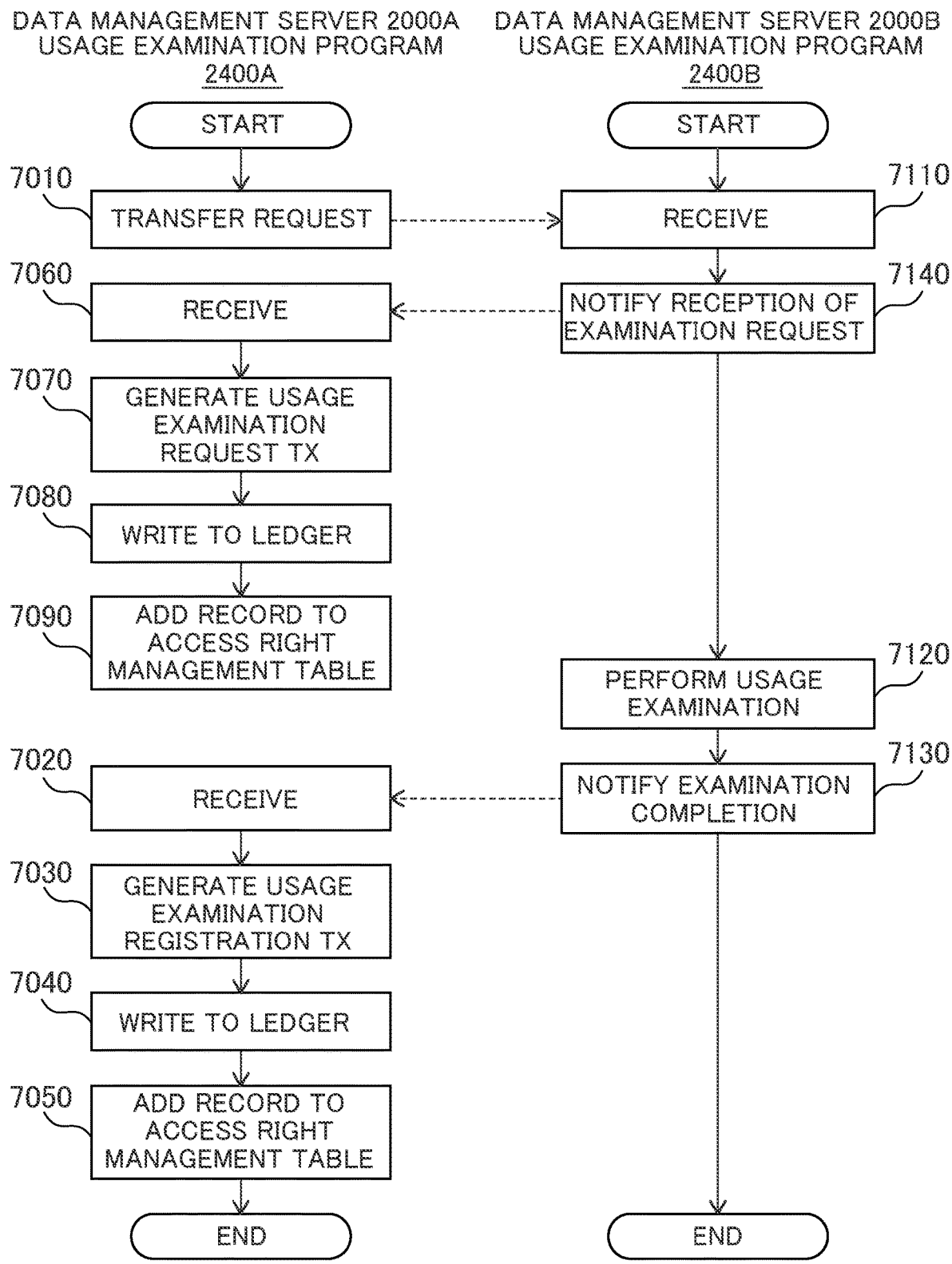
FIG. 7B is a second usage examination flowchart.

FIG. 7B illustrates the second flow of the usage examination. The usage examination may take time when it is necessary to confirm the identity of a requester of the usage examination. In such a case, the second flow separates the usage examination request from the usage examination to prevent the usage examination program 2400A of data management server 2000A from awaiting a response from the data management server 2000B for a long time. The flowchart of FIG. 7B uses the same reference numerals as those of the flowchart in FIG. 7A for the same steps as in FIG. 7A and a description thereof is omitted.

The usage examination program 2400B of the data management server 2000B receives the usage examination request (7110) and then notifies the data management server 2000A that the examination request is received (7140). The usage examination program 2400B does not examine whether the data usage is permitted at this stage. Therefore, the acceptance notification can be notified to the data management server 2000A without delay.

The usage examination program 2400A of the data management server 2000A receives an examination request reception notification from the data management server 2000B (7060) and then generates a transaction (usage examination request TX) that indicates the history of examination requests for access to the data (7070). The generated transaction is validated by another data management server maintaining the distributed shared ledger and then is written to the distributed processing ledger (7080). The transaction is added as one record to the access right management table (7090).

When the usage examination is complete, the usage examination program 2400B of the data management server 2000B transmits an examination completion notification to the data management server 2000A (7130). The flow thereafter is the same as the flow illustrated in FIG. 7A.

FIG. 10B illustrates an example data structure of an access right management table 10000b as a distributed shared ledger corresponding to the flowchart in FIG. 7B. The access right management table 10000b records a usage examination request transaction and a usage examination registration transaction and the correspondence between these. The columns differing from FIG. 10A are transaction type column 10021 and parent transaction 10022. Column 10021 registers information that identifies the usage examination request transaction and the usage examination registration transaction. Column 10022 registers TXID of the usage examination request transaction corresponding to the usage examination registration transaction.

Suppose TXID "B1001" is a transaction associated with the usage examination request for one piece of original data contained in the usage examination request received at step 7110. Suppose TXID "B1002" is a transaction associated with the usage examination of the usage examination request. Then, column 10021 of TXID "B1001" registers "A" to indicate the usage examination request transaction. Columns 10022 and 10006 register "–" because of the usage examination request transaction. Column 10005 registers the usage examination request time. Column 10021 of TXID "B1002" registers "B" indicating the usage examination registration transaction. Column 10022 registers TXID "B1001" for the corresponding usage examination request transaction. Column 10005 registers the usage examination implementation time. Column 10006 registers "1" indicating that the usage request is permitted for the relevant data.

Data Analysis Flow

Figure 8:
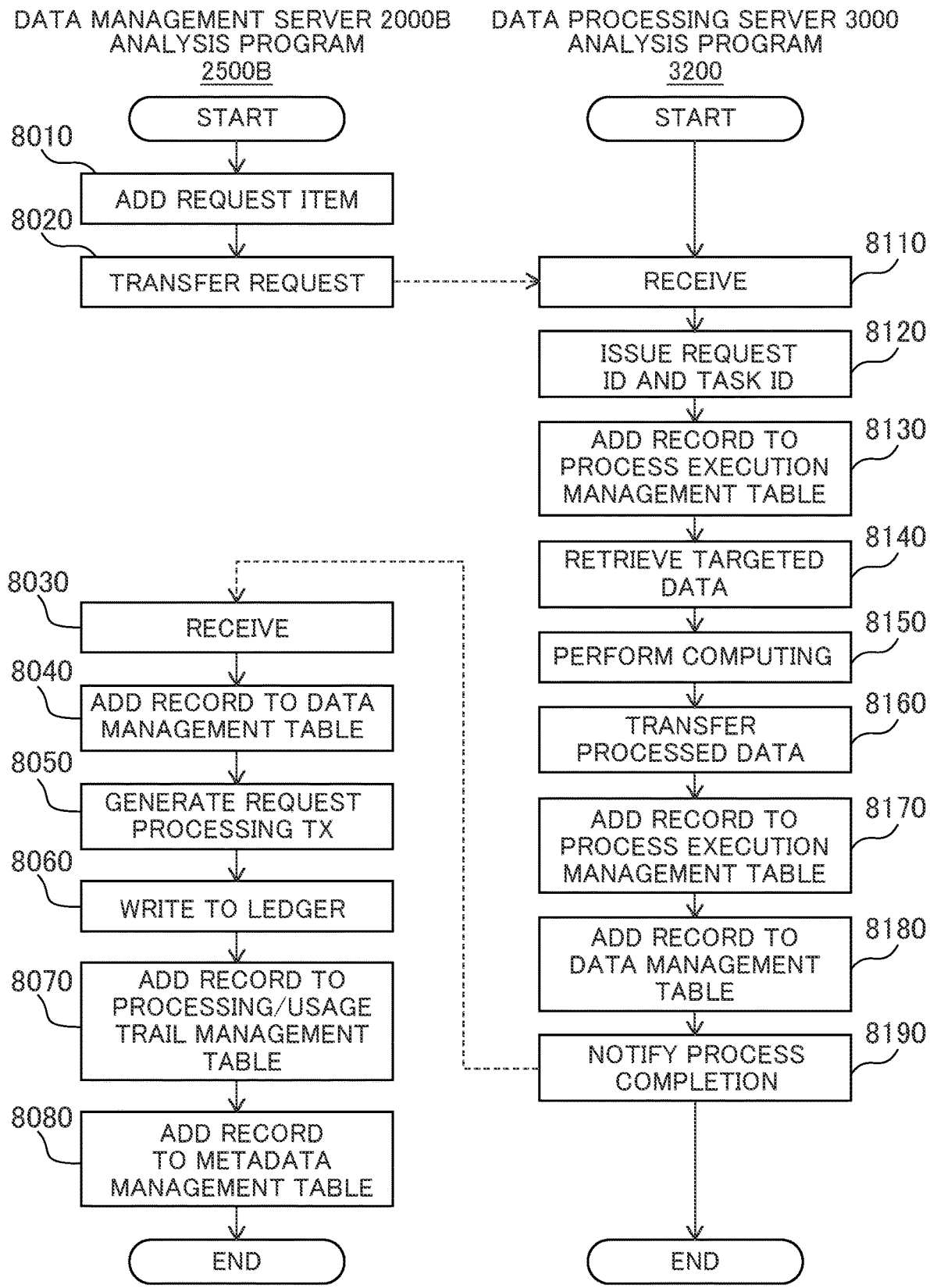
FIG. 8 is a data analysis flowchart.

The description below explains the data analysis process corresponding to step 6210 of the flowchart in FIG. 6. FIG. 8 illustrates an example flow of the data analysis.

The data management server 2000A of data user A transmits an analysis request to the data management server 2000B of data provider B. Then, the analysis program 2500B adds items necessary for performing the analysis process to the received analysis request (8010). For example, the added items include data path of the original data to be processed ("last month's AMeDAS measurement data in Tokyo's 23 wards," "last month's PM2.5 measurement data in the Kanto region," and "weather forecast data for the next month in Japan"), data ID of the processed data, data path as a processed data output destination (referred to as a "processed data path"), and user ID of a data processor who performs the analysis process. The following example assumes that data provider B performs the analysis process by using the data processing server 3000 as its resource. However, data provider B can request data processor C to perform the analysis process. In this case, a data processing server as a resource of data processor C is used to perform the analysis process The analysis program 2500B transfers the analysis request including the added items to the data processing server 3000 (8020). The analysis program 3200 of the data processing server 3000 receives the request (8110).

The analysis program 3200 assigns a request ID and a task ID to the received analysis request. The task ID is assigned to each of the multiple tasks that need to be performed to finally acquire the processed data. The request ID issued at step 8120 is unique throughout the system. According to the present embodiment, the distributed shared ledger records the data history such as data registration or processing as a trail that is highly protected against falsification. Therefore, the distributed shared ledger records analysis requests from data user A. The request ID must be unique throughout the system so that the request ID is not duplicated in the distributed shared ledger. The task ID is linked to the request ID.

In this example, the data processing server 3000 performs four tasks (task IDs: XYZ-1 through XYZ-4) based on an analysis request (request ID: XYZ) to acquire "PM2.5 distribution forecast data in Tokyo's 23 wards the following week (processed data, data ID: 00044)" from "last month's AMeDAS measurement data in Tokyo's 23 wards (original data, data ID: 00011)," "last month's PM2.5 measurement data in the Kanto region (original data, data ID: 00022)," and "weather forecast data for the next month in Japan (original data, data ID: 00033)."

Task 1 (XYZ-1) extracts data of Tokyo's 23 wards (00022-1) from the data of the Kanto region (00022). The processed data for each task is referred to as intermediate processed data. The data ID of the intermediate processed data is linked to the data ID of data as the source of the intermediate processed data. When one piece of intermediate processed data can be acquired from multiple pieces of original data, the data ID of the intermediate processed data may be linked to the data ID of any one of the source data.

Task 2 (XYZ-2) extracts data of Tokyo's 23 wards for the next week (00033-1) from the data for the next month (00033) throughout Japan.

Task 3 (XYZ-3) analyzes the relationship (00011-1) between the AMeDAS measurement data (00011) and the PM2.5 measurement data (00022-1).

Task 4 (XYZ-4) calculates PM2.5 forecast data (00044) for the next week based on the relationship (00011-1) between AMeDAS measurement data and PM2.5 measurement data and the next week's weather forecast (00033-1).

The analysis program 3200 configures a calculation resource for each task based on the data processing specifications configured by data user A (step 6030 of the flowchart in FIG. 6). The calculation resource can be generated by supplying the software version and parameters to be used. The contents of the task configured for the analysis request are registered to the process execution management table 15000 of the data processing server 3000.

FIG. 15 illustrates an example data structure of the process execution management table 15000. The process execution management table 15000 includes request ID column 15001, task ID column 15002, parent data ID column 15003, data path (parent) column 15004, child data ID column 15005, data path (child) column 15006, user ID column 15007, provider ID column 15008, processor ID column 15009, usage range column 15010, computation resource column 15011, and process time column 15012. Column 15001 records a request ID. Column 15002 records a task ID. Column 15003 records a data ID of processed source data (referred to as parent data). Column 15004 records a parent data storage address (data path). Column 15005 records a data ID of intermediate processed data or processed data (referred to as child data) resulting from the process. Column 15006 records a child data storage address (data path). Column 15007 records a user ID of the data user as an analysis requester. Column 15008 records a user ID of the data provider of parent data. Column 15009 records a user ID of the data processor to process data. Column 15010 records the usage scope of parent data. Column 15011 records predetermined computation resources. Column 15012 records the time of the analysis process performed by the data processing server 3000. Like the original data, the child data may be stored as data content itself on the storage medium 3150 of the data processing server 3000 or cloud-based object storage.

At step 8130, the program registers the contents of columns 15001 to 15011 for each task.

The analysis program 3200 accesses the data storage address indicated by the data path of the parent data, retrieves the data to be processed (8140), performs the process using the predetermined computation resources (8150), and stores the resulting child data at the data storage address indicated by the data path of the child data of (8160).

The analysis program 3200 then records the time required to perform the analysis process for each task at column 15012 of the process execution management table 15000 (8170). The program also registers the processed data to a data management table 14000' of the data processing server 3000 (8180). The data structure of the data management table 14000' is similar to that illustrated in FIG. 14. Record 14012 concerns the processed data. Column 14001 registers a data ID of processed data. Column 14003 registers a data ID of parent data (or data ID of intermediate processed data). Column 14004 registers a user ID of the data processor. This example registers "100" indicating the data processor and data provider B. When data processor C performs the analysis process, the user ID of data processor C is registered.

The analysis process then terminates on the data processing server 3000. The analysis program 3200 issues a process completion notification to the data management server 2000B (8190). The process completion notification is supplied with a record of the process execution management table 15000 linked to the request ID. The data path information (columns 15004 and 15006) may be excluded from the record attached to the process execution management table 15000.

It is not necessary to save all intermediate processed data after the process completion notification. However, for reuse, it is favorable to save frequently used intermediate processed data or an intermediate process requiring heavy computation resource loads to generate intermediate processed data. Intermediate processed data determined to be unnecessary to save is removed from the data path. The data processor determines whether to save intermediate processed data for each task. Supposed the intermediate processed data is saved. When another analysis request is received to search the process execution management table 15000, the use of the intermediate processed data saved in the storage can omit the computational resources and the computation time to acquire intermediate processed data again.

The analysis program 2500B of the data management server 2000B receives the process completion notification from the data processing server 3000 (8030) and then registers the processed data to its data management table 14000 (8040). Record 14012 in the data management table 14000 illustrated in FIG. 14 corresponds to the record of the processed data. The contents of the record are similar to those in the data management table 14000' and a description is omitted.

The analysis program 2500B then generates a transaction (request processing TX) indicating that the analysis request has been processed (8050). The generated transaction is validated by another data management server maintaining the distributed shared ledger and then is written to the distributed processing ledger (8060). The transaction is added as one record to a processing/usage trail management table (8070).

FIG. 11 illustrates an example data structure of a processing/usage trail management table 11000 as a distributed shared ledger. The processing/usage trail management table 11000 includes transaction ID column 11001, request ID column 11002, task ID column 11003, parent data ID column 11004, child data ID column 11005, user ID column 11006, provider ID column 11007, processor ID column 11008, usage range column 11009, computation resource column 11010, process time column 11011, generated data format column 11012, transaction time column 11013, provider signature column 11014, verification time column 11015, and verifier signature column 11016. Columns 11002 to 11011 register the contents of the corresponding column of a record that is included in the process execution management table 15000 and is attached to the process completion notification. Column 11012 registers the data format of child data acquired by the task. Columns 11013 to 11016 register verification information about the transaction.

The analysis program 2500B then generates a transaction (metadata registration TX) indicating that the processed data acquired by the analysis request has been registered to the system. The generated transaction is validated by another data management server maintaining the distributed shared ledger and then is written to the distributed processing ledger. The transaction is added as one record to the metadata management table (8080).

A record for the processed data corresponds to the record of TXID "C2001" in the metadata management table 12000 illustrated in FIG. 12. Column 12006 contains the signature of data user A because it is the processed data. Similar to the original data, the processed data is registered to the metadata management table 12000 and is thereby usable in the data utilization system.

The process of the analysis program 2500B then terminates. As above, the request-based program 2300B of the data management server 2000B provides data user A with the processed data acquired by the analysis process (6220).

Billing Process Flow

Figure 9:
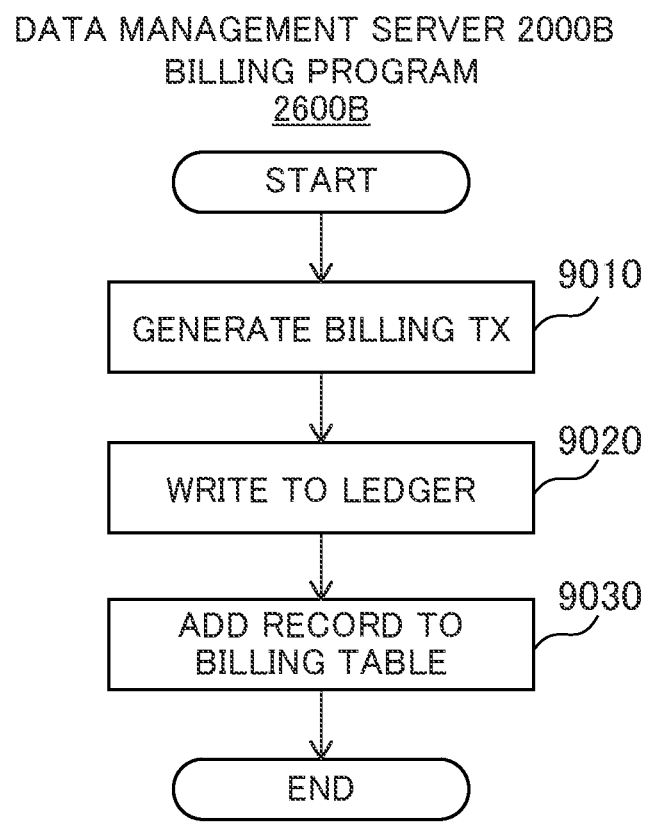
FIG. 9 is a billing flowchart.

The description below explains the billing process according to step 6240 of the flowchart in FIG. 6. FIG. 9 illustrates a billing process flow.

The billing program 2600B of the data management server 2000B generates a transaction (billing TX) for billing associated with the data utilization (9010). The generated transaction is validated by another data management server maintaining the distributed shared ledger and then is written to the distributed processing ledger (9020). The transaction is added as one record to a billing table (9030). After the billing transaction is settled, a predetermined currency amount specified in the settled transaction takes effect.

FIG. 13 illustrates an example data structure of a billing table 13000 as a distributed shared ledger. The billing table 13000 includes transaction ID column 13001, billing source ID column 13002, billing destination ID column 13003, targeted transaction ID column 13004, currency amount column 13005, transaction time column 13006, user signature column 13007, provider signature column 13008, verification time column 13009, and verifier signature column 13010.

For example, suppose the provision of the processed data described as the example is recorded as a record indicated by TXID "D1001." Then, column 13002 records user ID "100" of data provider B. Column 13003 records user ID "200" of data user A. This reveals that the amount billed for the provision of the processed data corresponds to currency amount 1500. The record for TXID "D1003" concerns multiple agents as the billing source. In this case, the currency amount can be distributed according to contribution rates. The contribution rate can be agreed among multiple billing sources according to the amount of original data or the number of computation resources used for processing.

The above-described embodiments are examples to describe the present invention. The scope of the invention is not limited to the embodiments. The invention can be variously modified and embodied.

LIST OF REFERENCE SIGNS

1000: Terminal, 1100: Network, 1200: Common network, 2000: Data management server, 3000: Data processing server, 4000: Client server, 2120, 3120, 4120: Processor, 2130, 3130, 4130: Input/output device, 2140, 3140, 4140: Memory, 2150, 3150, 4150: Storage medium, 2160, 3160, 4160: Network interface, 2170, 3170, 4170: Bus, 2200: Data registration program, 2300: Request-based program, 2400: Usage examination program, 2500: Analysis program, 2600: Billing program, 3200: Analysis program, 4200: Data registration program, 4300: Request-based program, 10000: Access right management table, 11000: Processing/usage trail management table, 12000: Metadata management table, 13000: Billing table, 14000, 14000': Data management table, 15000: Process execution management table.

The invention claimed is:

1. A data provision method in a data utilization system that is connected to a network and includes: a plurality of data management servers including a first data management server for a first user and a second data management server for a second user; and a data processing server, wherein each of the data management servers maintains a distributed shared ledger, the method comprising:

executing, by the first data management server:

a data registration program to save first data in storage;

generating a first transaction indicating the first data having been saved, and adding the verified first transaction as a record in a metadata management table as one of the distributed shared ledgers;

transmitting, by the second data management server, an analysis request for processing the first data to the first data management server;

executing, by the first data management server:

receiving the analysis request;

executing an analysis program;

transferring the analysis request to the data processing server;

executing by the data processing server:

upon receiving the analysis request, generate and store a process execution management table, which includes a first data storage path for the first data and a second data storage path for second data resulting from processing the first data and predetermined computation resources corresponding to the first data;

retrieving the first data using the first data storage path;

processing the first data using the predetermined computation resources corresponding to the first data;

storing the second data resulting from processing the first data according to the second data storage path; and executing by the first data management server:

receiving a notification of having processed the first data from the data processing server;

generating a second transaction indicating the first data having been processed according to the analysis request; and adding the verified second transaction as a record in a processing/usage trail management table as one of the distributed shared ledgers.

2. The data provision method according to claim 1, wherein the first data management server executes the analysis program to generate a third transaction indicating the second data having been stored in storage, and adds the verified third transaction as a record in the metadata management table.

3. The data provision method according to claim 2, wherein the first data management server provides the second data for the second data management server after the verified second transaction is added to the processing/usage trail management table and the verified third transaction is added to the metadata management table.

4. The data provision method according to claim 1, wherein the metadata management table includes data ID specifying saved data to be saved in storage, provider ID specifying a provider of the stored data, metadata outlining the saved data, and transaction verification information;

wherein the data ID is uniquely assigned in the data utilization system; and wherein the metadata is specified according to a data format of the saved data.

5. The data provision method according to claim 1, wherein the processing/usage trail management table includes request ID identifying an analysis request to process data to be processed and acquire processed data, parent data ID identifying the data to be processed, child data ID identifying the processed data, user ID identifying a requester of the analysis request, provider ID identifying a provider of the data to be processed, processor ID used to process the data to be processed, a computation resource used to process the above data to be processed, time required to process the data to be processed, and transaction verification information; and wherein the request ID is uniquely assigned in the data utilization system.

6. The data provision method according to claim 1, wherein the data processing server receives an analysis request transferred from the first data management server, performs a process on the first data by dividing the process into a plurality of tasks, saves intermediate processed data acquired by performing the task in storage, and save information about processing on the first data in the process execution management table;

wherein the process execution management table includes request ID identifying the analysis request, task ID identifying the task, parent data ID identifying the first data to be processed for the task, child data ID identifying the second data, user ID identifying a requester of the analysis request, provider ID identifying a provider of the data to be processed, processor ID used to process the above data to be processed, and time required to process the data to be processed; and wherein the request ID is uniquely assigned in the data utilization system, and the task ID is linked to the request ID.

7. The data provision method according to claim 6, wherein the data processing server receives a transfer of an analysis request unlike the analysis request from the first data management server, processes the data to be processed according to the other analysis request by searching the process execution management table, and uses the intermediate processed data that corresponds to the analysis request and is stored in the storage.

8. The data provision method according to claim 1, wherein the second data management server receives a data request for the second data from the second user and searches the metadata management table to specify the first data needed to acquire the second data; and wherein the second data management server executes a usage examination program to transmit a usage examination request for the first data to the first data management server, receives an examination completion notification from the first data management server, generates a fourth transaction indicating a usage examination having been applied to the first data, and adds the verified fourth transaction as a record in the access right management table as one of the distributed shared ledgers.

9. The data provision method according to claim 8, wherein the fourth transaction includes data ID identifying the first data, user ID identifying the second user, provider ID identifying the first user, examination implementation time to have examined the usage examination request, and status indicating the availability of permission for the second user to use the first data.

10. The data provision method according to claim 9, wherein the second data management server executes the usage examination program to receive an examination request reception notification from the first data management server, generates a fifth transaction indicating acceptance of a usage examination request for the first data, and adds the verified fifth transaction as a record in the access right management table.

11. The data provision method according to claim 10, wherein the fifth transaction includes data ID identifying the first data, user ID identifying the second user, provider ID identifying the first user, and examination request time to have accepted the usage examination request.

12. The data provision method according to claim 11, wherein the access right management table includes the fourth transaction and verification information on the fourth transaction, the fifth transaction and verification information on the fifth transaction, and correspondence between the fourth transaction and the fifth transaction.

13. The data provision method according to claim 8, wherein the second user specifies a computation resource to process the first data in the usage examination request for the first data.

14. The data provision method according to claim 3, wherein the first data management server provides the second data for the first data management server and then executes a billing program to generate a sixth transaction indicating billing for provision of the second data, and adds the verified sixth transaction as a record in a billing table as one of the distributed shared ledgers.

15. The data provision method according to claim 14, wherein the billing table includes billing source ID identifying a source of billing, billing destination ID identifying a destination of billing, targeted transaction ID identifying a target of billing, currency amount indicating a billing amount, and transaction verification information.

* * * * *